(12) United States Patent
Ross et al.

(10) Patent No.: US 10,654,580 B2
(45) Date of Patent: May 19, 2020

(54) TILTROTOR OUTBOARD FIXED ENGINE CONFIGURATION WITH OFFSET ROTATION SPINDLE AND INTERCONNECT DRIVE SHAFT

(71) Applicant: Bell Helicopter Textron Inc., Fort Worth, TX (US)

(72) Inventors: Brent Chadwick Ross, Flower Mound, TX (US); Daniel B. Robertson, Southlake, TX (US)

(73) Assignee: BELL HELIPCOPTER TEXTRON INC., Fort Worth, TX (US)

( * ) Notice: Subject to any disclaimer, the term of this patent is extended or adjusted under 35 U.S.C. 154(b) by 481 days.

(21) Appl. No.: 15/625,452

(22) Filed: Jun. 16, 2017

(65) Prior Publication Data

US 2018/0362180 A1    Dec. 20, 2018

(51) Int. Cl.
*B64D 35/02*    (2006.01)
*B64C 29/00*    (2006.01)

(52) U.S. Cl.
CPC .......... *B64D 35/02* (2013.01); *B64C 29/0033* (2013.01)

(58) Field of Classification Search
CPC ...... B64D 35/02; B64C 29/0033; B64C 27/28
See application file for complete search history.

(56) References Cited

U.S. PATENT DOCUMENTS

| 8,021,116 | B2 | 9/2011 | Brunken, Jr. |
| 9,126,678 | B2 | 9/2015 | Ross et al. |
| 9,174,731 | B2 | 11/2015 | Ross et al. |
| 9,399,513 | B2 | 7/2016 | Sutton et al. |
| 2017/0158323 | A1 | 6/2017 | Ross et al. |

FOREIGN PATENT DOCUMENTS

| EP | 2484587 A1 | 8/2012 |
| EP | 2778063 A1 | 9/2014 |
| EP | 2837558 A1 | 2/2015 |
| EP | 3415425 A1 | 12/2018 |

OTHER PUBLICATIONS

European Patent Office, Communication Pursuant to Article 94(3) EPC for EP Appl. No. 18177635.2 dated Apr. 30, 2019, 4 pp.
European Patent Office, European Search Report for EP Appl. No. 18177635.2 dated Oct. 23, 2018, 4 pp.
European Patent Office, Communication Pursuant to Article 94(3) EPC for EP Appl. No. 18177635.2 dated Nov. 5, 2018, 6 pp.

*Primary Examiner* — Rodney A Bonnette
(74) *Attorney, Agent, or Firm* — Edwin S. Flores; Daniel J. Chalker; Chalker Flores, LLP (57) ABSTRACT

The present invention includes a rotorcraft drive system, method, and aircraft comprising a fixed engine; a rotating spindle that rotates a proprotor gearbox and rotor pylon between a hover and forward flight position, wherein the rotating spindle rotates about a rotation bearings on two inboard ribs of a wing member; and an interconnect drive shaft connected to the fixed engine, wherein the interconnect drive shaft passes through an aft cove of the wing member and connects to the engine via a forward-aft drive shaft, wherein the forward-aft drive shaft is connected to the proprotor gearbox to provide power to a proprotor.

24 Claims, 9 Drawing Sheets

TILTROTOR OUTBOARD FIXED ENGINE CONFIGURATION WITH OFFSET ROTATION SPINDLE AND INTERCONNECT DRIVE SHAFT

CROSS-REFERENCE TO RELATED APPLICATIONS

Not applicable.

STATEMENT OF FEDERALLY FUNDED RESEARCH

Not applicable.

TECHNICAL FIELD OF THE INVENTION

The present invention relates in general to the field of drive systems, and more particularly, to tiltrotor engine nacelle and rotor pylon designs.

BACKGROUND OF THE INVENTION

Without limiting the scope of the invention, its background is described in connection with rotorcraft drive systems.

U.S. Pat. No. 9,126,678, issued to Ross, et al., is entitled "Spindle mounted tiltrotor pylon with fixed engine arrangement", and teaches a rotor system for tilt rotor aircraft that comprises an engine disposed at a first fixed location on a wing member; a prop-rotor pylon mechanically coupled to the engine along a drive path, and a gearbox disposed in the drive path. The prop-rotor pylon is rotatably mounted on a spindle, and the prop-rotor pylon is configured to selectively rotate about a rotational axis of the spindle between a vertical position and a horizontal position. The gearbox comprises a rotational axis aligned with the rotational axis of the spindle.

U.S. Pat. No. 9,174,731, issued Ross, et al., entitled "Fixed engine and rotating proprotor arrangement for a tiltrotor aircraft", and teaches a tiltrotor aircraft that includes a fuselage; a wing member having a first rib, a second rib, a first spar, second spar; and an upper wing skin; an engine disposed at a fixed location relative to the wing member; and a proprotor having a spindle gearbox, rotor mast, and a plurality of rotor blades drivable in rotation about the rotor mast, the spindle gearbox being rotatable about a conversion axis. The spindle gearbox is located above the upper wing skin of the wing member.

SUMMARY OF THE INVENTION

In one embodiment, the present invention includes a rotorcraft drive system comprising: one or more fixed engines; a rotating spindle that rotates a proprotor gearbox and rotor pylon between a hover and forward flight position, wherein the rotating spindle rotates about a rotation bearings on two inboard ribs of a wing member; and an interconnect drive shaft connected to the one or more fixed engines, wherein the interconnect drive shaft passes through an aft cove of the wing member and connects to the one or more fixed engines via a forward-aft drive shaft, wherein the forward-aft drive shaft is connected to the proprotor gearbox to provide power to a proprotor. In one aspect, the one or more fixed engines are positioned at least one of: at an end of a first wing member, at an end of a second wing member opposite the first wing member, or centrally in, at, or about a fuselage. In another aspect, the interconnect drive shaft connects to the one or more fixed engines by a spiral bevel gear. In another aspect, the one or more fixed engines connects to the forward-aft drive shaft via one or more reduction gears. In another aspect, the rotorcraft drive system further comprises a bevel gear connected to the forward-aft drive shaft that connects at a spindle center of rotation. In another aspect, the interconnect drive shaft is positioned aft from a continuous aft spar of the wing member. In another aspect, the rotating spindle is positioned immediately aft from a forward wing spar. In another aspect, the rotating spindle is positioned forward from an aft wing spar. In another aspect, the rotorcraft drive system further comprises a U-shaped extension connected to an end of a forward wing spar of the wing member that supports the rotor pylon in a forward position. In another aspect, the rotorcraft drive system further comprises a tip rib that supports a non-rotating portion of the drive system and that provides one or more attachment locations for the one or more fixed engines. In another aspect, the wing member comprises swept wings.

In another embodiment, the present invention includes a method of providing power to a proprotor comprising: providing one or more fixed engines; positioning a rotating spindle that rotates a proprotor gearbox and pylon between a hover and forward flight position, wherein the rotating spindle rotates about two rotation bearings on inboard ribs of a wing member; and connecting an interconnect drive shaft to the one or more fixed engines, wherein the interconnect drive shaft passes through an aft cove of the wing member and connects to the one or more fixed engines via a forward-aft drive shaft, wherein the forward-aft drive shaft is connected to the proprotor gearbox to provide power to the proprotor. In one aspect, the one or more fixed engines are positioned at least one of: at an end of a first wing member, at an end of a second wing member opposite the first wing member, or centrally in, at, or about a fuselage. In another aspect, the method further comprises connecting the interconnect drive shaft to the one or more fixed engines by a spiral bevel gear. In another aspect, the method further comprises connecting the one or more fixed engines to the forward-aft drive shaft via one or more reduction gears. In another aspect, the method further comprises connecting a bevel gear to the forward-aft drive shaft at a spindle center of rotation. In another aspect, the method further comprises positioning the interconnect drive shaft aft from a continuous aft spar of the wing member. In another aspect, the method further comprises positioning the rotating spindle immediately aft from a forward wing spar. In another aspect, the method further comprises positioning the rotating spindle forward from an aft wing spar. In another aspect, the method further comprises connecting a U-shaped extension to an end of a forward wing spar of the wing member to supports the rotor pylon in a forward position. In another aspect, the method further comprises providing a tip rib that supports a non-rotating portion of the drive system and that provides one or more attachment locations for the one or more fixed engines. In another aspect, the wing member comprises swept wings.

In yet another embodiment, the present invention includes an aircraft comprising: a fuselage connected to a wing member; one or more engines; a rotating spindle that rotates a proprotor gearbox and rotor pylon between a hover and forward flight position, wherein the rotating spindle rotates about rotation bearings on two inboard ribs an of the wing member;

and an interconnect drive shaft connected to the one or more engines, wherein the interconnect drive shaft passes through an aft cove of the wing member and connects to the one or more engines via a forward-aft drive shaft, wherein the forward-aft drive shaft is connected to the proprotor gearbox to provide power to a proprotor. In one aspect, the one or more engines are positioned at least one of: at an end of a first wing member, at an end of a second wing member opposite the first wing member, or centrally in, at, or about the fuselage.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The invention locates a fixed engine outboard of a rotating rotor pylon. The engine position is forward inline with the wing torque box, which extends beyond the rotating spindle. A tip rib outboard of the spindle supports the fixed engine and forward-aft shaft which connects the interconnect drive shaft and the engine output. A spiral bevel at the spindle located within the wing torque box transitions from the forward-aft shaft to the proprotor gearbox. The present invention can be used with any tiltrotor engine nacelle and rotor pylon designs.

The primary embodiment of the drive system arrangement is used with outboard engines. An alternate embodiment eliminates the engine input on the forward-aft shaft and allows for inboard mounted engines through the interconnect drive shaft. Power is transmitted through a helical gear train to a forward-aft shaft connecting to the interconnect drive shaft in the aft cove of the wing by a spiral bevel gear. In the middle of the forward-aft shaft another spiral bevel connects to a short shaft aligned with the spindle center of rotation. A helical gearset common to the short shaft allows rotation of the proprotor gearbox (spiral bevel and planetary gearset) with the pylon spindle to which it is attached.

The wing structural arrangement includes two inboard ribs between the forward and aft spars, which support the cantilevered pylon rotation spindle. An additional rib outboard of the spindle is supported by a U-shaped extension around the spindle of the forward spar and a continuous aft spar. The tip rib supports the nonrotating portion of the drive system and provides attachment locations for engine attachment links.

The configuration provides an outboard fixed engine with a relatively simple drive system and good structural support for pylon and engine attachment. However, the present invention can be used with one or more engines that are located anywhere in, on, or about the wings or fuselage of a craft, such as an aircraft. For example, the one or more fixed engines can be on the ends of the wings, within the wings, adjacent to the fuselage, in the fuselage, or any combination thereof.

The outboard placement of the engine maximizes clearance space below the wing. The arrangement of pylon, engine, wing structure, and gear geometry reduces drive system complexity and weight compared to other fixed engine options. It also allows the rotor pylon rotation spindle to be located within the wing torque box rather than aft of the wing torque box like other Bell tiltrotors. This allows the spindle to be located at the wing shear center for increased structural efficiency. In addition, the location within the torque box can be tailored allowing less wing sweep and provides flexibility in tailoring alignment of the rotor in helicopter mode with the aircraft center of gravity.

Figure 1:
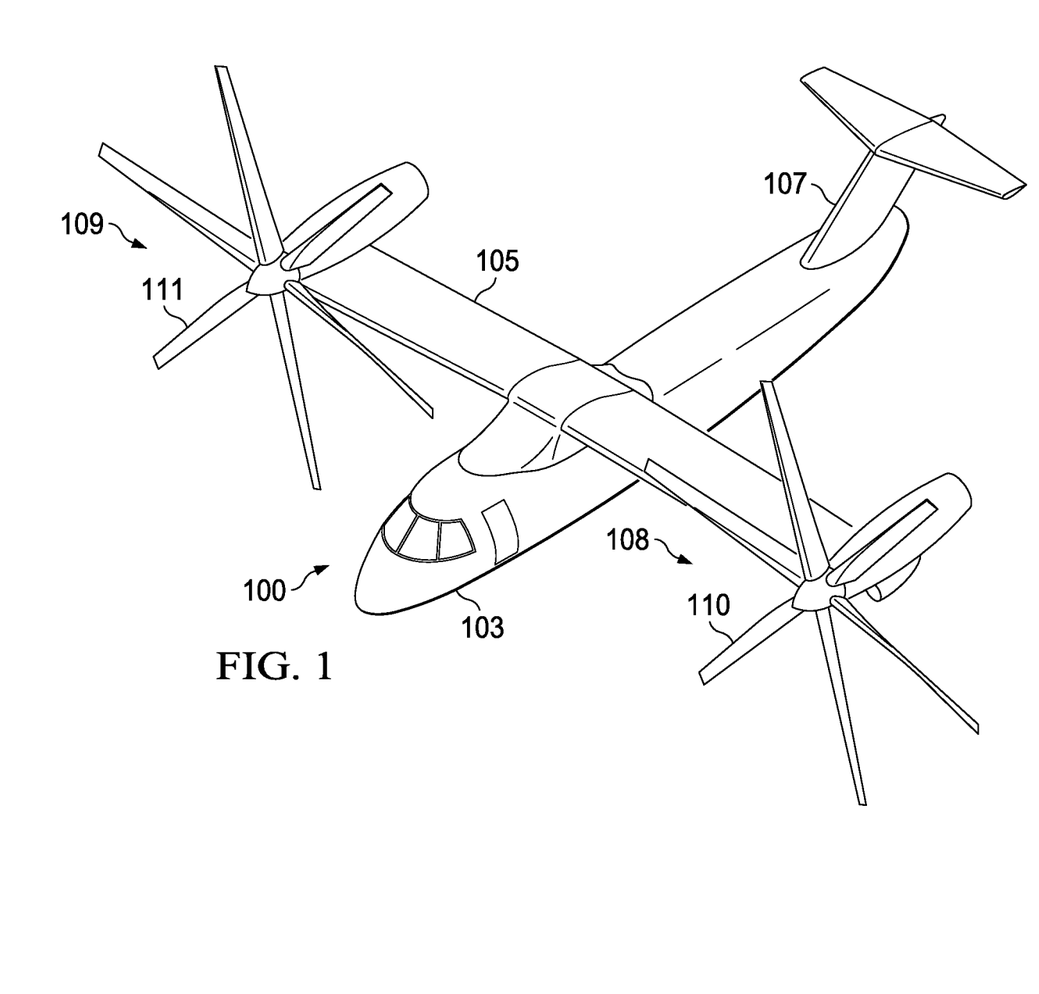
FIG. 1 shows a perspective view of tiltrotor aircraft according to one embodiment of the present invention.

FIG. 1 shows a tilt rotor aircraft 100. In one embodiment the tilt rotor aircraft 100 comprises a fuselage 103, a wing member 105, and a tail member 107. While described as a single wing member 105, it is to be understood that the wing member 105 may be formed from separate components such that two or more wing members are coupled to the fuselage 103 (e.g., each side of the fuselage may comprise a separate wing member). The aircraft 100 may also include a first rotor system 108 and a second rotor system 109. The first rotor system 108 is located on an end portion of a first side of the wing member 105, while second rotor system 109 is located an end portion of a second side of the wing member 105.

The first rotor system 108 and second rotor system 109 are substantially symmetric of each other about the fuselage 103. The first rotor system 108 and the second rotor system 109 each include a plurality of rotor blades 110 and 111 coupled to a rotor hub, respectively. In the interest of clarity, only the first rotor system 108 will be discussed in detail in the following description. However, it should be understood that the form and function of the second rotor system 109 can be fully understood from the description of the first rotor system 108 described herein.

While FIG. 1 illustrates the rotor systems 108, 109 in the context of a tilt-rotor aircraft, it should be understood that the first rotor system 108 and the second rotor system 109 can be implemented on other tilt rotor aircraft. For example, an alternative embodiment may include a quad tilt rotor aircraft that has an additional wing member located aft of wing member 105, the additional wing member can have additional rotor systems similar to first rotor system 108 and the second rotor system 109. In some embodiments, the rotor systems 108, 109 can be used with an unmanned version of a tilt rotor aircraft 100. Further, the first rotor system 108 and/or the second rotor system 109 can be integrated into a variety of tilt rotor aircraft configurations.

Figure 2:
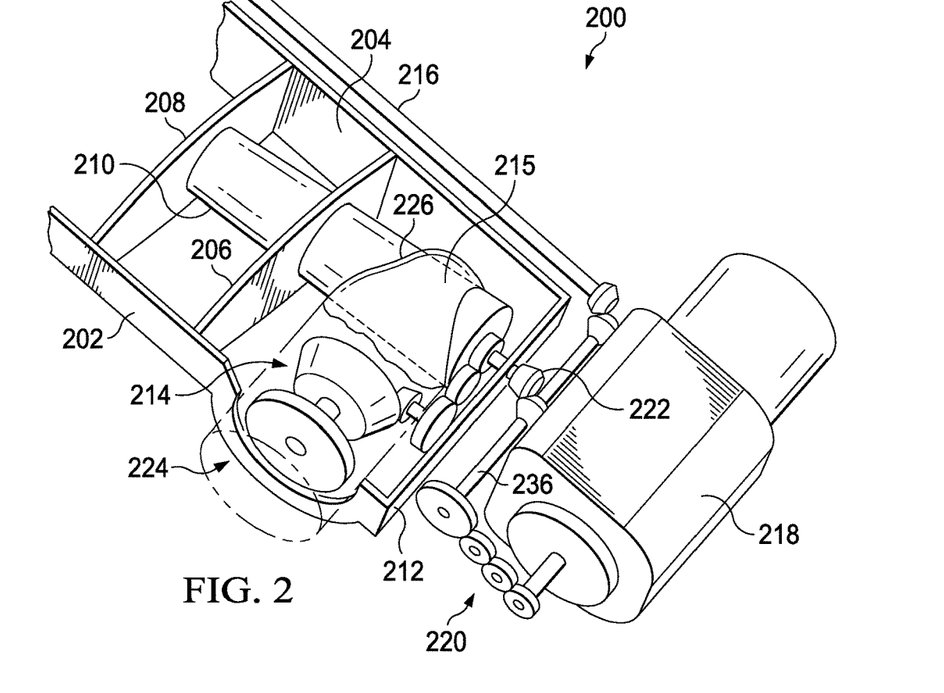
FIG. 2 shows a top, isometric view of the drive system of the present invention.

FIG. 2 shows a top, isometric view of the drive system 200 of the present invention. This figure shows the structural layout of the basic drive system 200 in which the interior components of the wing and end of the wing are shown, starting with forward spar 202, which is depicted having a curved or open portion 224 that is sized to allow space for a proprotor pylon 226. A continuous aft spar 204 is also depicted, which is connected to the forward spar 202 by an outboard spindle support rib 206, inboard spindle support rib 208, each of which has an opening for a pylon rotation spindle 210. The pylon rotation spindle 210 is depicted that drives the rotation of the proprotor pylon 226. An outboard tip rib 212 supports a fixed drive system and the engine 218, as described in greater detail herein below. Within the proprotor pylon 226 is a proprotor gearbox 214 and gearbox adapter 215 that structurally connects the proprotor gearbox to the rotating spindle 210. An interconnect drive shaft 216 that provides a drive system between the port and starboard engines, is positioned aft of the continuous aft spar 204 and forward of the flaperon closeout (not shown) forming an aft cove. The interconnect drive shaft 216 is connected to the engine 218 via forward-aft drive shaft 236, that connects to gears 220, which can be a series of reduction gears. The gears 220 connect to forward-aft drive shaft 236 that includes a gear that transfers power to a bevel gear 222, which can be a spiral bevel gear. The bevel gear 222 is connected to the proprotor gearbox 214 that includes gearbox adapter 215, which connects to and drives a proprotor (not depicted). The forward spar 202 includes a curved or open portion 224, which is sized to fit the proprotor pylon 226. In this figure, the proprotor pylon 226 is in a forward or cruise position, that is, a proprotor connected to the proprotor gearbox 214 mast is positioned for forward flight.

Figure 3:
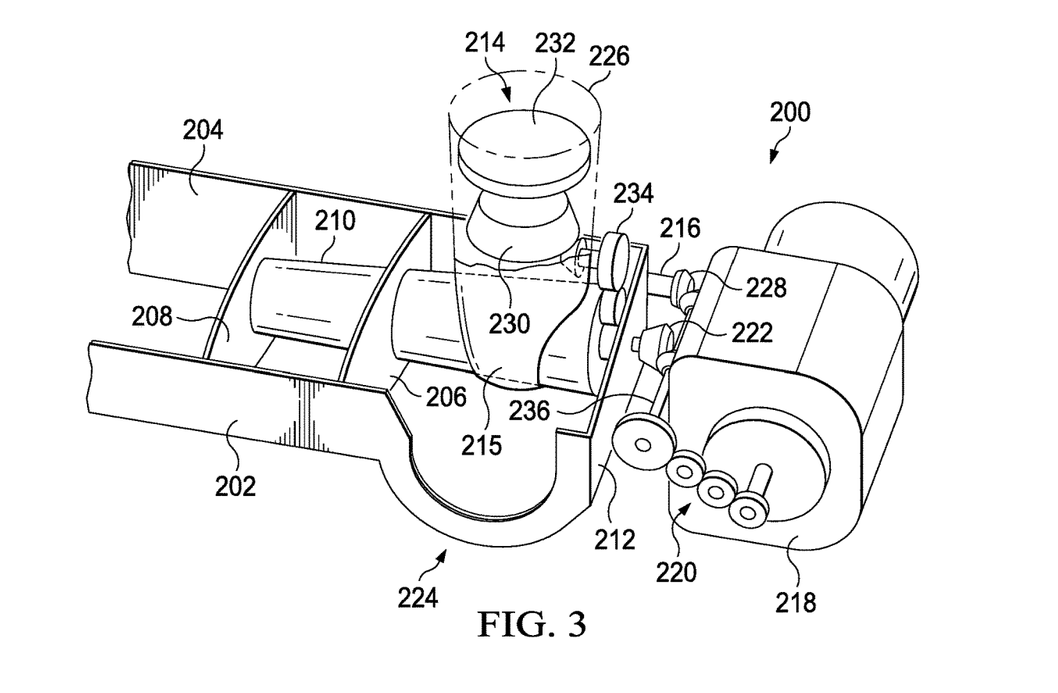
FIG. 3 shows a forward, isometric top view of the drive system of the present invention.

FIG. 3 shows a forward, isometric top view of the drive system 200 of the present invention that shows more detail with regard to the relationship between the pylon rotation spindle 210 and the proprotor pylon 226, which pylon 226 is depicted such that a proprotor (not depicted) is in a hover or helicopter position. The forward spar 202 is depicted having a curved portion 224 that is sized to allow space for a proprotor pylon 226. A continuous aft spar 204 is also depicted, which is connected to the forward spar 202 by an outboard spindle support rib 206 and inboard spindle support rib 208. A pylon rotation spindle 210 is depicted that drives the rotation of the proprotor pylon 226. An outboard tip rib 212 connecting the forward and aft spar supports a fixed drive system and the engine 218, as described in greater detail herein below. Within the proprotor pylon 226 is a proprotor gearbox 214 and gearbox adapter 215 that connects the gearbox to the rotation spindle 210. The interconnect drive shaft 216 provides a mechanical connection between the port and starboard engines and is positioned aft of the continuous aft spar 204 in the aft cove between the aft spar and flaperon closeout. The interconnect drive shaft 216 is connected to the engine 218 by forward-aft drive shaft 236 and an interconnect spiral bevel 228. The gears 220 are depicted as a helical gear train, which is connect to a bevel gear 222, which can be a spiral bevel gear, by a forward-aft drive shaft 236. The bevel gear 222 is connected to the proprotor gearbox 214 via rotating helical gears 234. The proprotor gearbox 214 is composed of proprotor spiral bevel 230 that connects to a proprotor planetary gearset 232 that drives a proprotor (not depicted).

Figure 4A:
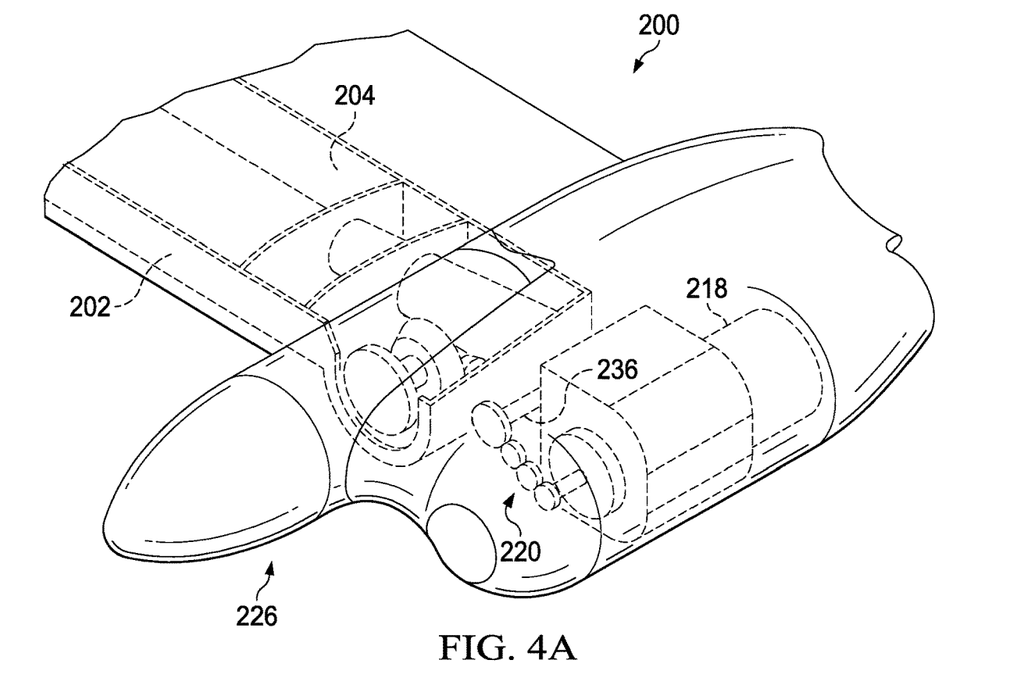
FIG. 4A shows an isometric view of the drive system of the present invention with the proprotor pylon in the forward or cruise position.

FIG. 4A shows an isometric view of the drive system 200 of the present invention with the proprotor pylon 226 in the forward or cruise position. The engine 218 is fixed to the wing at the end of forward spar 202 and aft spar 204, with the gears 220 and forward-aft drive shaft 236. In this position, the proprotor pylon 226 is flush with the wing.

Figure 4B:
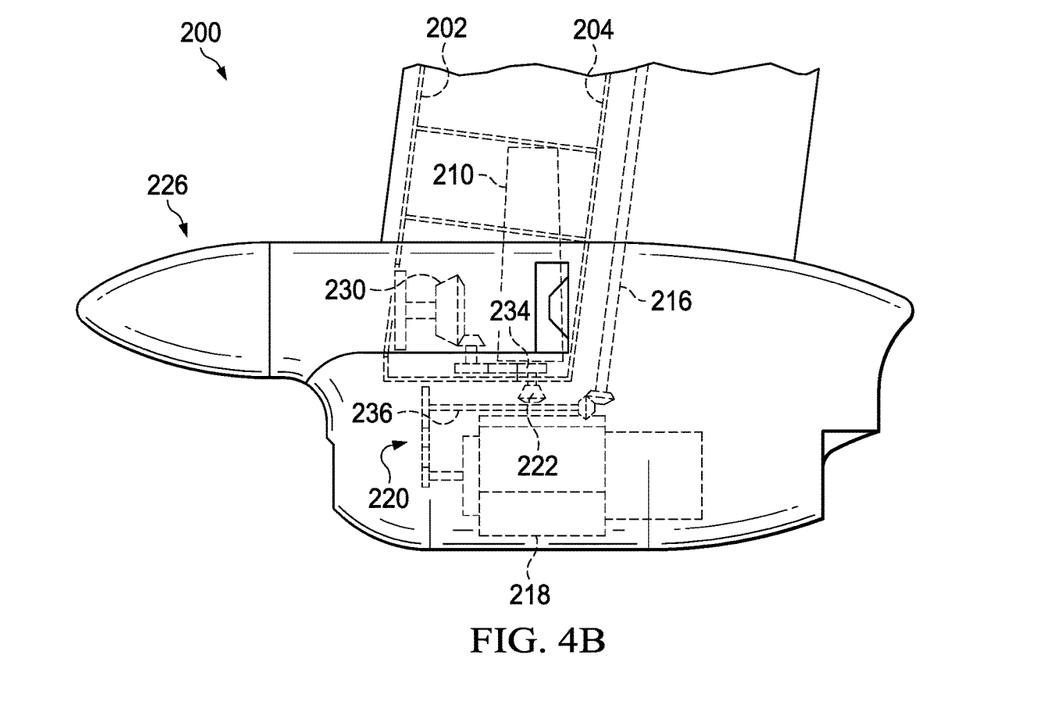
FIG. 4B shows a top view of the drive system of the present invention with the proprotor pylon in the forward or cruise position.

FIG. 4B shows a top view of the drive system 200 of the present invention with the proprotor pylon 226 in the forward or cruise position. The engine 218 connects to the gears 220 to the forward-aft drive shaft 236, which connects to the bevel gear 222. The bevel gear 222 is structurally supported by the fixed outboard tip rib with the rotating helical gears 234 rotating about the spindle axis as the spindle 210 is actuated (actuator not shown), however, the actuator can be telescoping (V-22, 609) or a rotary spindle actuator configuration can be used. The rotating helical gears 234 connect to the proprotor spiral bevel 230, which connects to the proprotor gear and the proprotor. The forward-aft drive shaft 236 also connects to the interconnect drive shaft 216.

Figure 4C:
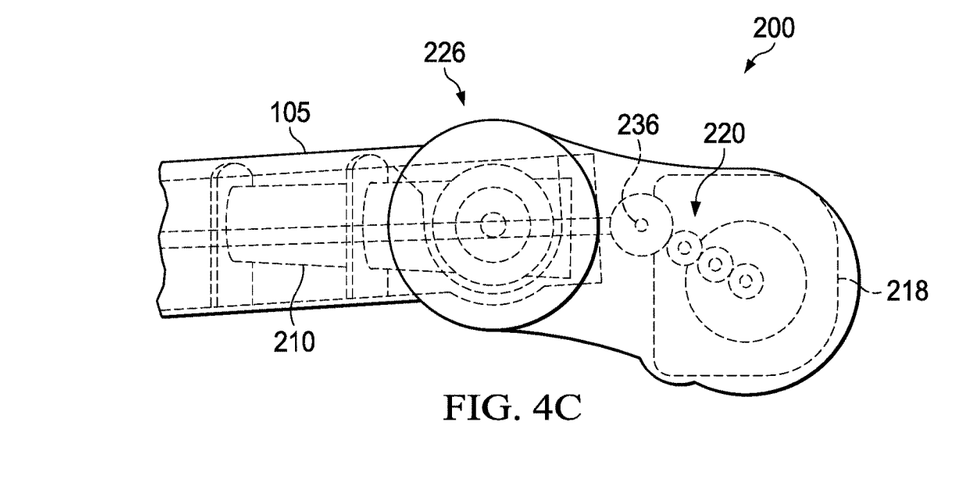
FIG. 4C shows a front view of the drive system of the present invention with the proprotor pylon in the forward or cruise position.

FIG. 4C shows a front view of the drive system 200 of the present invention with the proprotor pylon 226 in the forward or cruise position.

Figure 4D:
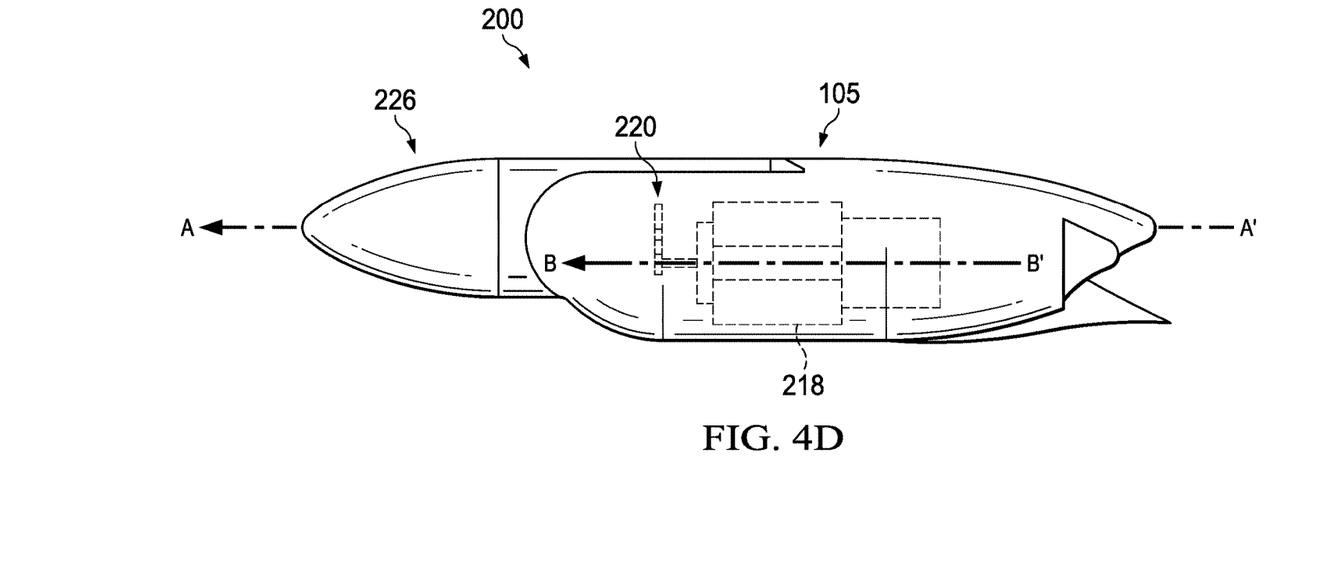
FIG. 4D shows a side view of the drive system of the present invention with the proprotor pylon in the forward or cruise position

FIG. 4D shows a side view of the drive system 200 of the present invention with the proprotor pylon 226 in the forward or cruise position, and shows one possible position for the engine 218 in relation to the wing. In this embodiment, the longitudinal axis B-B' of the engine 218 is positioned slightly below the longitudinal axis A-A' of the wing 105, shown in relation with the gears 220, which is depicted as a gear train.

Figure 5A:
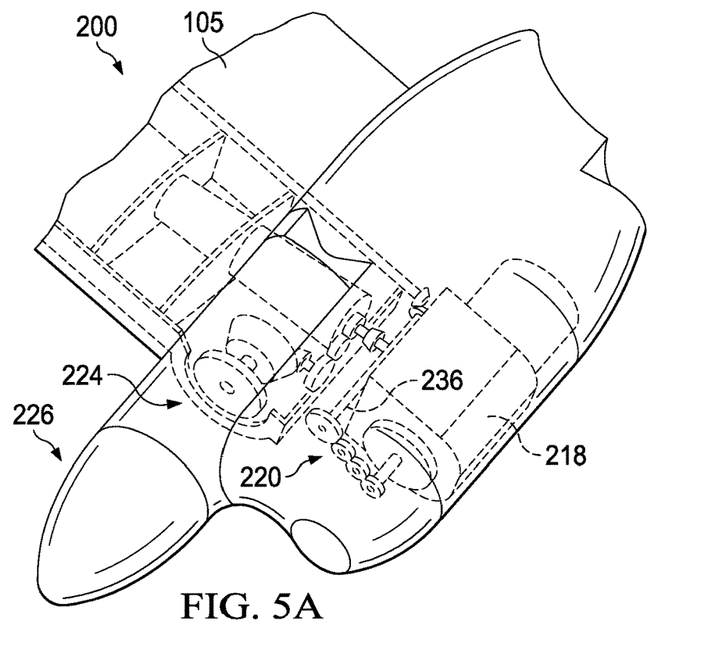
FIG. 5A shows an isometric view of the drive system of the present invention in airplane or cruise mode.

FIG. 5A shows an isometric view of the drive system 200 of the present invention with the proprotor pylon 226 in the forward or cruise position. The engine 218 is fixed to the end of the wing 105, shown in relation to the gears 220 and forward-aft shaft 236. In this position, the rotor pylon 226 is flush with the wing 105 and is cradled in the curved portion 224.

Figure 5B:
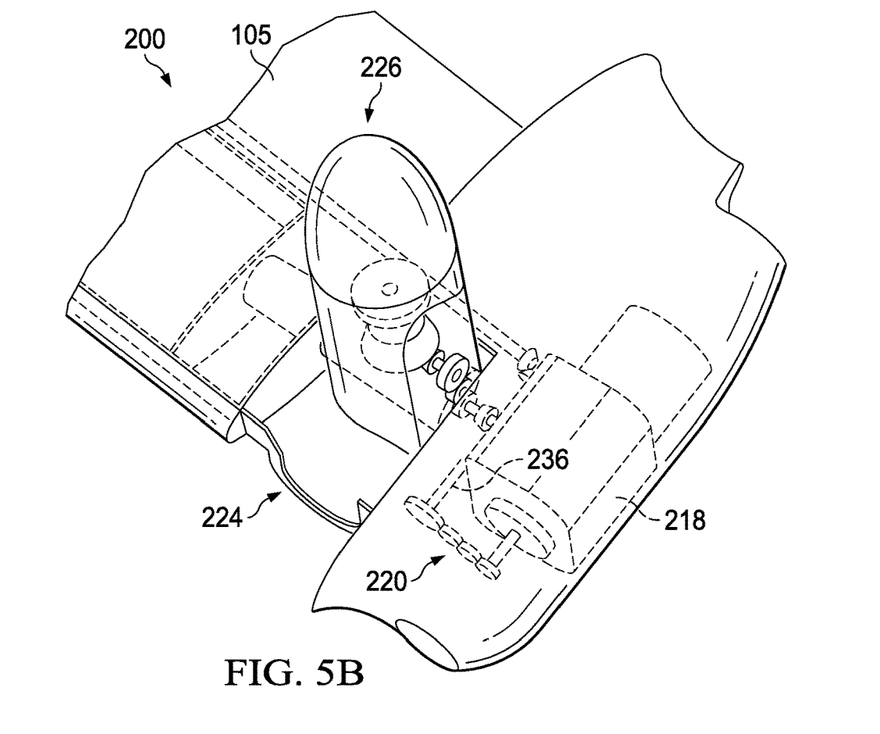
FIG. 5B shows an isometric view of the drive system of the present invention in helicopter or hover mode.

FIG. 5B shows an isometric view of the drive system 200 of the present invention in helicopter or hover mode. The engine 218 is fixed to the end of the wing 105, shown in relation to the gears 220 and forward-aft shaft 236. In this position, the proprotor pylon 226 is in a vertical position and is shown in relation to the wing 105 and the curved portion 224.

Figure 6A:
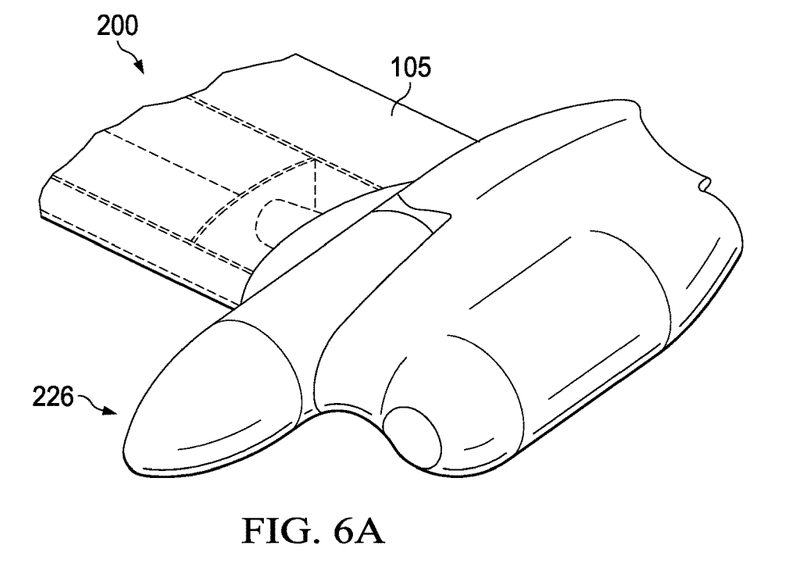
FIG. 6A shows an isometric view of the drive system of the present invention in airplane or cruise mode.

FIG. 6A shows an isometric view of the drive system 200 of the present invention in airplane or cruise mode in which the proprotor pylon 226 is nestled in the wing 105.

Figure 6B:
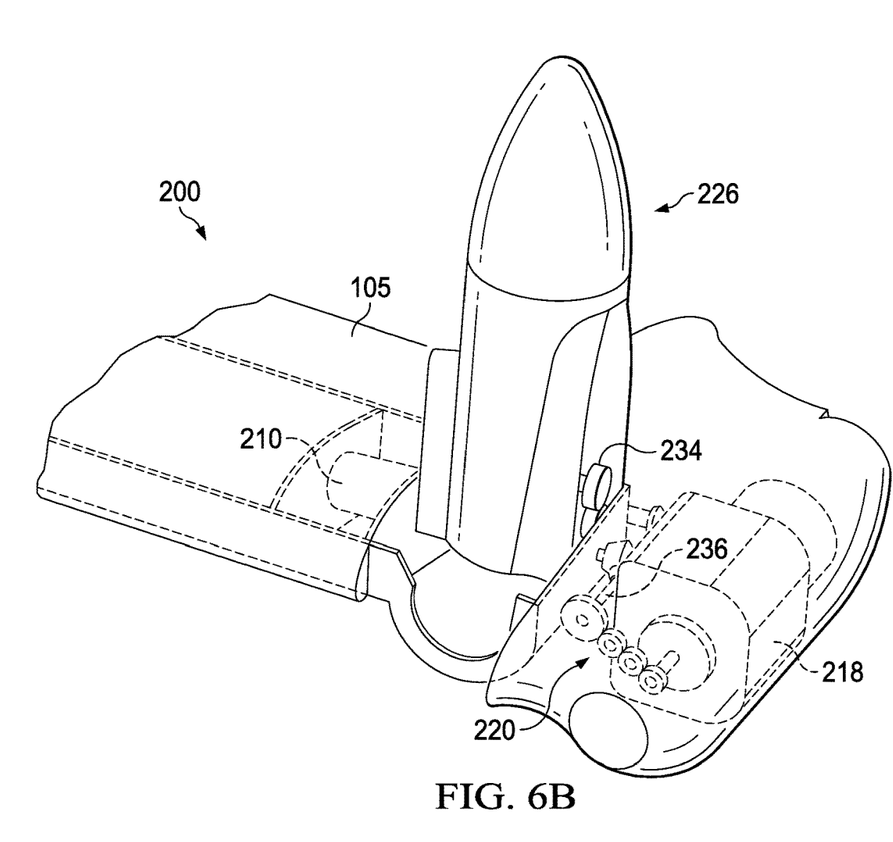
FIG. 6B shows an isometric view of the drive system of the present invention in helicopter or hover mode.

FIG. 6B shows an isometric view of the drive system 200 of the present invention in helicopter or hover mode. This view shows additional detail with regard to the drive train, in particular, the position and operation of the engine 218, connected to gears 220, forward-aft drive shaft 236, the rotating helical gears 234 that transfer power to the proprotor (not depicted), in relation to the pylon rotation spindle 210.

Figure 7A:
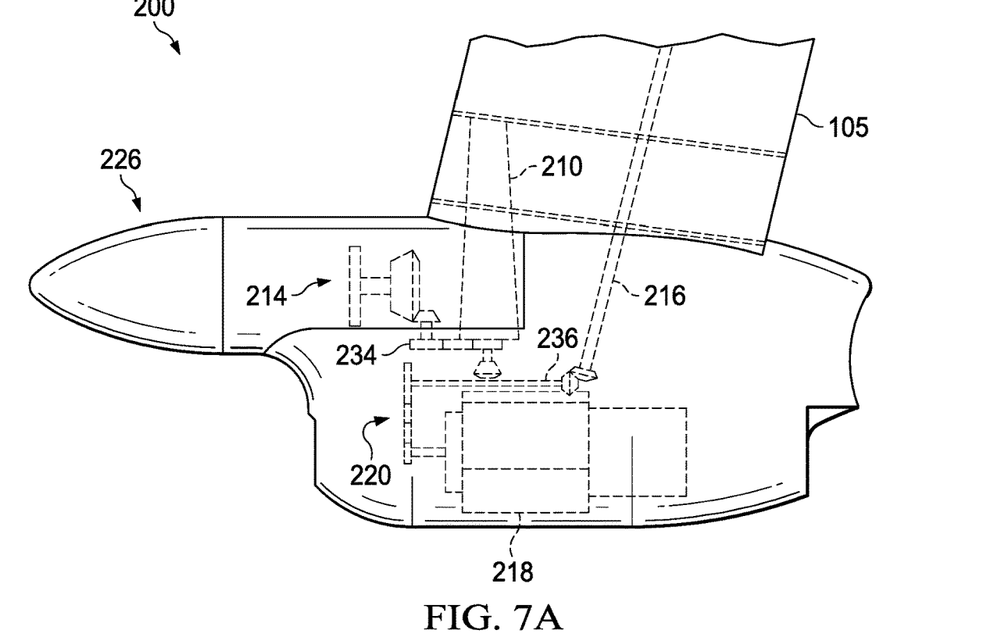
FIG. 7A shows one position for the spindle in a forward location.
Figure 7B:
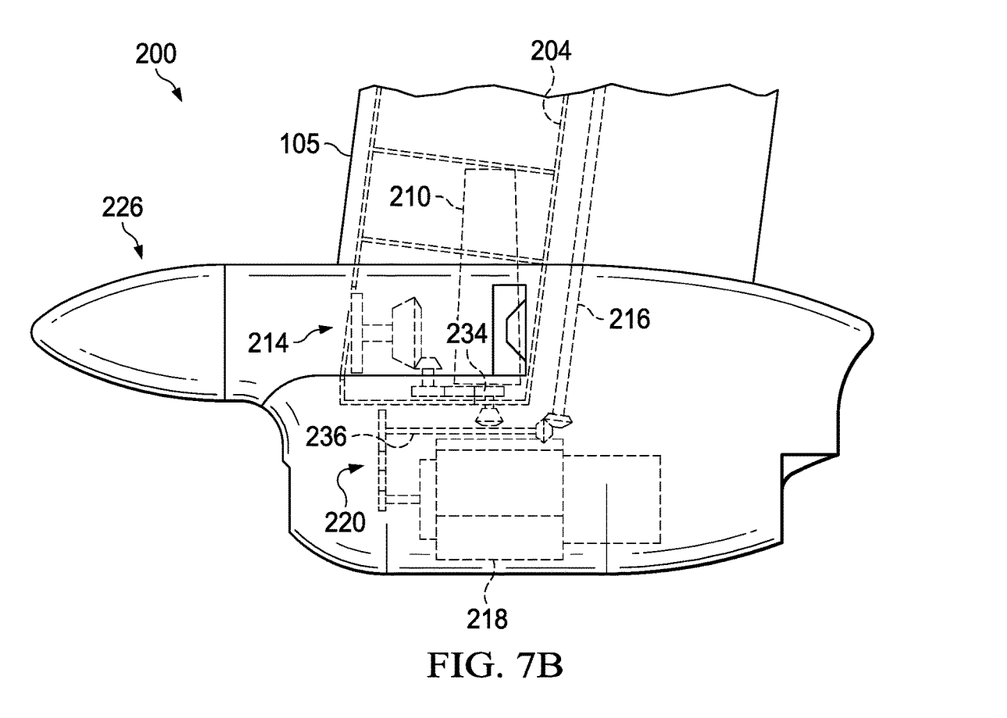
FIG. 7B shows another position for the spindle in an aft location.

FIGS. 7A and 7B show top views of the drive system 200 of the present invention in which the pylon rotation spindle 210 can be located in different positions in relation to the wing 105. In FIG. 7A, the pylon rotation spindle 210 is positioned toward the front of the wing 105, just aft of the forward spar (not depicted). The engine 218, gears 220, forward-aft drive shaft 236, the rotating helical gears 234, the gearbox adapter 215, and the interconnect drive shaft 216, are pushed forward in relation to the wing 105. The interconnect drive shaft 216 can be positioned adjacent a mid-wing spar.

FIG. 7B shows another position for the spindle in an aft location. In FIG. 7B, the pylon rotation spindle 210 is positioned toward the aft of the wing 105, just forward of the aft spar 204. The engine 218, gears 220, forward-aft drive shaft 236, the rotating helical gears 234, the gearbox adapter 215, and the interconnect drive shaft 216, are pushed forward in relation to the wing 105. The interconnect drive shaft 216 can be positioned adjacent a mid-wing spar.

Figure 8:
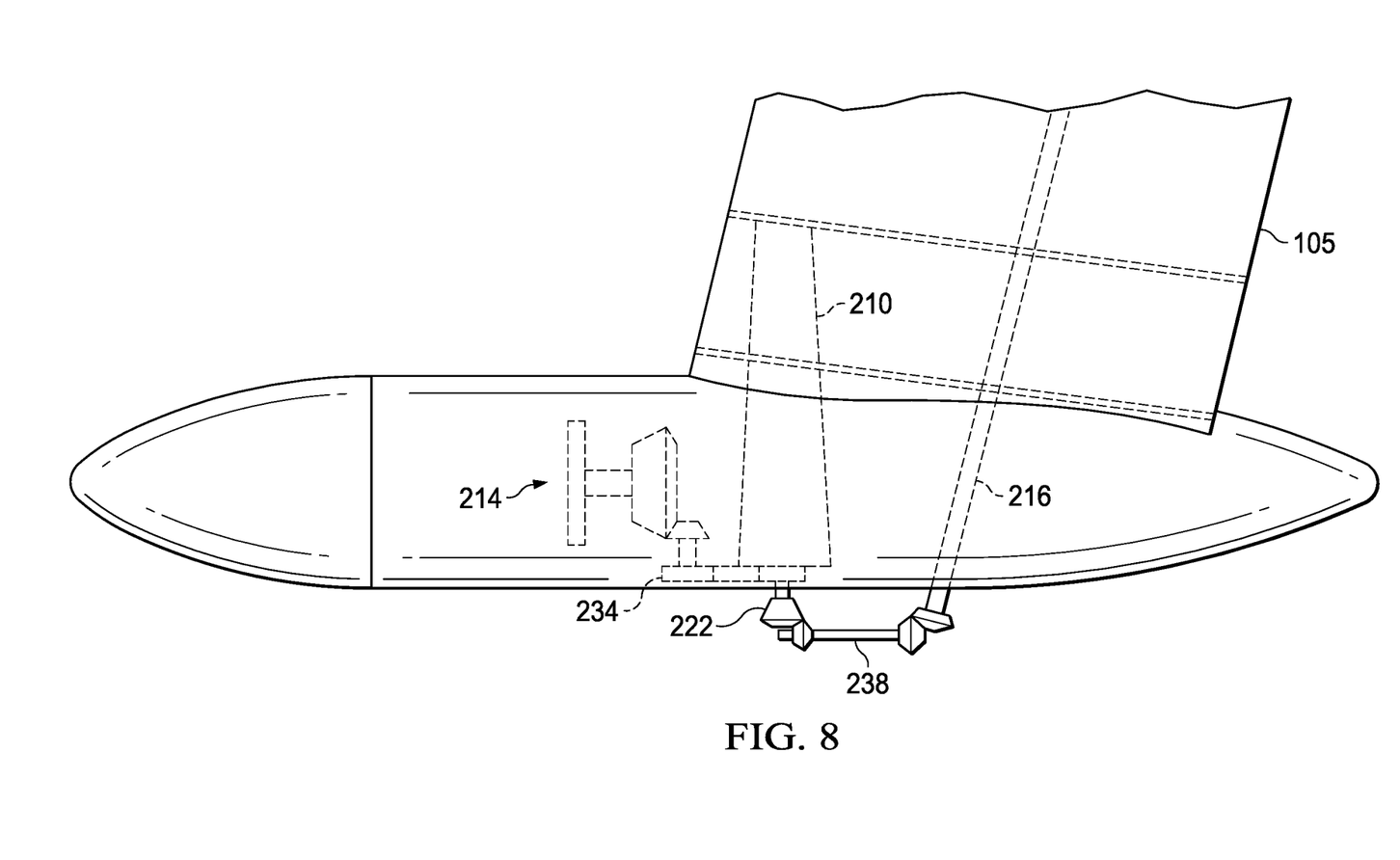
FIG. 8 shows an inboard spindle and pylon arrangement with the removal of a forward helical gear train such that the proprotor gearbox is powered exclusively by an interconnect drive shaft.

FIG. 8 shows an inboard spindle and pylon arrangement with the removal of a forward helical gear train for an inboard engine placement driving the interconnect driveshaft. In FIG. 8, the pylon rotation spindle 210 is positioned in the forward position (just aft of the forward spar 202) in the wing 105. A shaft 238 connects the spiral bevel gear 222 to the interconnect drive shaft 216. This arrangement facilitates an inboard engine placement (single or twin engine) further inboard on the wing or in the fuselage. Example engine placements include configurations shown in U.S. Pat. No. 9,376,206, or such as Bell Eagle Eye UAV.

Figure 9:
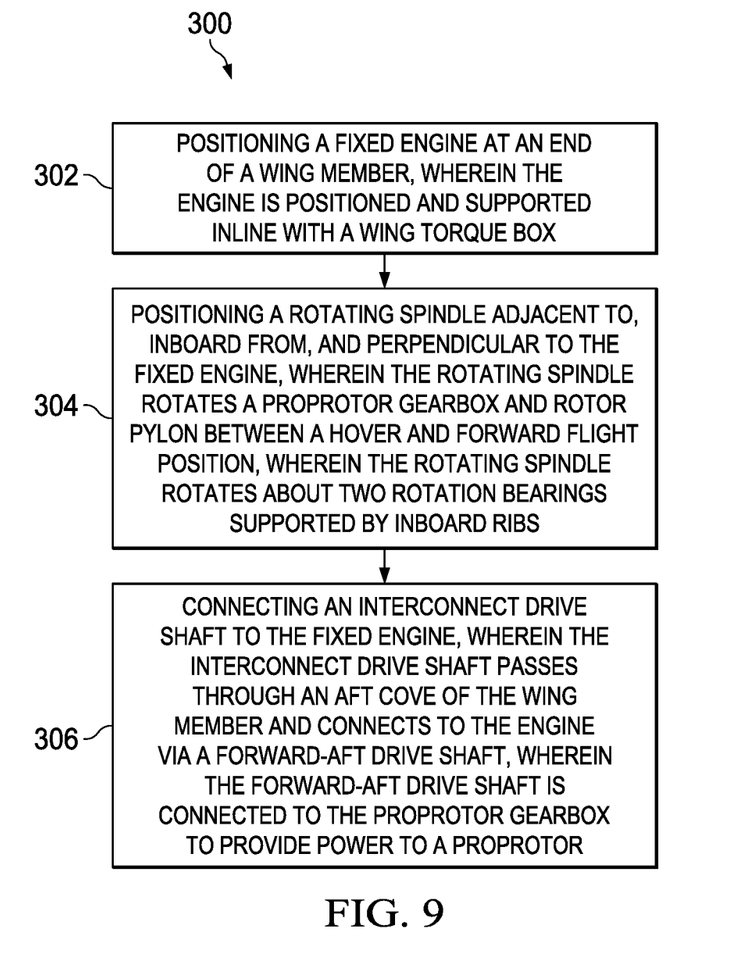
FIG. 9 shows a flowchart that shows a method transitioning a rotorcraft between a hover and forward flight mode of the present invention.

FIG. 9 shows a flowchart 300 that shows a method transitioning a rotorcraft between a hover and forward flight mode of the present invention. The method of providing power to a proprotor begins at step 302, by positioning a fixed engine at an end of a wing member, wherein the engine is positioned inline and supported by a wing torque box. Next, at step 304, the method includes positioning a rotating spindle adjacent to, inboard from, and perpendicular to the fixed engine, wherein the rotating spindle rotates a proprotor gearbox and rotor pylon between a hover and forward flight position, wherein the rotating spindle rotates about a two rotation bearings supported by inboard ribs. Finally, at step 306, the method concludes with connecting an interconnect drive shaft to the fixed engine, wherein the interconnect drive shaft passes through an aft cove of the wing member and connects to the engine via a forward-aft drive shaft, wherein the forward-aft drive shaft is connected to the proprotor gearbox to provide power to a proprotor.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of." As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step, or a limitation) or group of integers (e.g., feature(s), element(s), characteristic(s), property(ies), method/process step(s), or limitation(s)) only.

As used herein, the term "or combinations thereof" refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about," "substantial," or "substantially," refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the devices and/or methods disclosed and claimed herein can be made and executed without undue experimentation in light of the present disclosure. While the devices and/or methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope, and concept of the invention as defined by the appended claims.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components.

The methods may include more, fewer, or other steps. Additionally, steps may be performed in any suitable order.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

What is claimed is:

1. A rotorcraft drive system comprising:
   one or more fixed engines;
   a wing member comprising two inboard ribs and an outboard tip rib connected between a forward wing spar and an aft wing spar, and an aft cove positioned aft of the aft wing spar;
   a rotating spindle that rotates a proprotor gearbox and rotor pylon between a hover and forward flight position, wherein the rotating spindle rotates about a rotation bearings on the two inboard ribs of the wing member;
   an interconnect drive shaft connected to the one or more fixed engines, wherein the interconnect drive shaft passes through the aft cove of the wing member and connects to a forward-aft drive shaft located outboard of the outboard tip rib, wherein the forward-aft drive shaft is connected to the proprotor gearbox to provide power to a proprotor; and
   the forward wing spar of the wing member comprises a U-shaped extension between one of the inboard ribs and the outboard tip rib that is sized to allow space for and provide support of the rotor pylon in a forward position.

2. The rotorcraft drive system of claim 1, wherein the one or more fixed engines are positioned at least one of: at an end of a first wing member, at an end of a second wing member opposite the first wing member, or centrally in, at, or about a fuselage.

3. The rotorcraft drive system of claim 1, wherein the interconnect drive shaft connects to the one or more fixed engines by a spiral bevel gear.

4. The rotorcraft drive system of claim 1, wherein the one or more fixed engines connects to the forward-aft drive shaft via one or more reduction gears.

5. The rotorcraft drive system of claim 1, further comprising a bevel gear connected to the forward-aft drive shaft that connects at a spindle center of rotation.

6. The rotorcraft drive system of claim 1, wherein the interconnect drive shaft is positioned aft from the aft wing spar of the wing member.

7. The rotorcraft drive system of claim 1, wherein the rotating spindle is positioned immediately aft from the forward wing spar.

8. The rotorcraft drive system of claim 1, wherein the rotating spindle is positioned forward from the aft wing spar.

9. The rotorcraft drive system of claim 1, wherein the rotating spindle is offset from the interconnect drive shaft.

10. The rotorcraft drive system of claim 1, wherein the outboard tip rib supports a non-rotating portion of the drive system and provides attachment for the one or more fixed engines.

11. The rotorcraft drive system of claim 1, wherein the wing member comprises swept wings.

12. A method of providing power to a proprotor comprising:
   providing one or more fixed engines;
   providing a wing member comprising two inboard ribs and an outboard tip rib connected between a forward wing spar and an aft wing spar, and an aft cove positioned aft of the aft wing spar;
   positioning a rotating spindle that rotates a proprotor gearbox and rotor pylon between a hover and forward flight position, wherein the rotating spindle rotates about two rotation bearings on the inboard ribs of the wing member;
   connecting an interconnect drive shaft to the one or more fixed engines, wherein the interconnect drive shaft passes through the aft cove of the wing member and connects to a forward-aft drive shaft positioned outboard of the outboard tip rib, wherein the forward-aft drive shaft is connected to the proprotor gearbox to provide power to the proprotor; and
   forming the forward wing spar of the wing member to comprise a U-shaped extension between one of the inboard ribs and the outboard tip rib that is sized to allow space for and provide support of the rotor pylon in a forward position.

13. The method of claim 12, wherein the one or more fixed engines are positioned at least one of: at an end of a first wing member, at an end of a second wing member opposite the first wing member, or centrally in, at, or about a fuselage.

14. The method of claim 12, further comprising connecting the interconnect drive shaft to the one or more fixed engines by a spiral bevel gear.

15. The method of claim 12, further comprising connecting the one or more fixed engines to the forward-aft drive shaft via one or more reduction gears.

16. The method of claim 12, further comprising connecting a bevel gear to the forward-aft drive shaft at a spindle center of rotation.

17. The method of claim 12, further comprising positioning the interconnect drive shaft aft from the aft wing spar of the wing member.

18. The method of claim 12, further comprising positioning the rotating spindle immediately aft from the forward wing spar.

19. The method of claim 12, further comprising positioning the rotating spindle forward from the aft wing spar.

20. The method of claim 12, wherein the rotating spindle is offset from the interconnect drive shaft.

21. The method of claim 12, wherein the outboard tip rib supports a non-rotating portion of the drive system and provides attachment for the one or more fixed engines.

22. The method of claim 12, wherein the wing member comprises swept wings.

23. An aircraft comprising:
   a fuselage connected to a wing member, wherein the wing member comprises two inboard ribs and an outboard tip rib connected between a forward wing spar and an aft wing spar, and an aft cove positioned aft of the aft wing spar;
   one or more engines;
   a rotating spindle that rotates a proprotor gearbox and rotor pylon between a hover and forward flight position, wherein the rotating spindle rotates about rotation bearings on the two inboard ribs of the wing member;
   an interconnect drive shaft connected to the one or more engines, wherein the interconnect drive shaft passes through the aft cove of the wing member and connects to a forward-aft drive shaft positioned outboard of the outboard tip rib, wherein the forward-aft drive shaft is connected to the proprotor gearbox to provide power to a proprotor; and
   the forward wing spar of the wing member comprises a U-shaped extension between one of the inboard ribs and the outboard tip rib that is sized to allow space for and provide support of the rotor pylon in a forward position.

24. The aircraft of claim 23, wherein the one or more engines are positioned at least one of: at an end of a first wing member, at an end of a second wing member opposite the first wing member, or centrally in, at, or about the fuselage.

* * * * *